United States Patent
Lunttila et al.

(10) Patent No.: US 9,537,630 B2
(45) Date of Patent: Jan. 3, 2017

(54) METHOD FOR MULTIPLEXING OF UPLINK CONTROL INFORMATION

(71) Applicant: NOKIA SOLUTIONS AND NETWORKS OY, Espoo (FI)

(72) Inventors: Timo Erkki Lunttila, Espoo (FI); Esa Tapani Tiirola, Kempele (FI); Kari Juhani Hooli, Oulu (FI); Kari Pekka Pajukoski, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 106 days.

(21) Appl. No.: 14/349,365

(22) PCT Filed: Oct. 2, 2012

(86) PCT No.: PCT/EP2012/069442
§ 371 (c)(1),
(2) Date: Apr. 3, 2014

(87) PCT Pub. No.: WO2013/050360
PCT Pub. Date: Apr. 11, 2013

(65) Prior Publication Data
US 2014/0247798 A1   Sep. 4, 2014

Related U.S. Application Data

(60) Provisional application No. 61/543,097, filed on Oct. 4, 2011.

(51) Int. Cl.
*H04J 3/14* (2006.01)
*H04L 5/00* (2006.01)
*H04L 1/00* (2006.01)

(52) U.S. Cl.
CPC .......... *H04L 5/0037* (2013.01); *H04L 1/0023* (2013.01)

(58) Field of Classification Search
CPC . H04W 72/04; H04W 72/0413; H04L 1/0026; H04L 1/0027; H04L 1/18
See application file for complete search history.

(56) References Cited

U.S. PATENT DOCUMENTS

2012/0039291 A1* 2/2012 Kwon ................. H04L 1/0026
370/329
2014/0241319 A1* 8/2014 Lee ..................... H04L 1/0026
370/331

FOREIGN PATENT DOCUMENTS

WO    WO 2011/085230 A2    7/2011

OTHER PUBLICATIONS

International Search Report and Written Opinion dated Jan. 3, 2013 corresponding to International Patent Application No. PCT/EP2012/069442.

(Continued)

*Primary Examiner* — Alvin Zhu
(74) *Attorney, Agent, or Firm* — Squire Patton Boggs (US) LLP

(57) ABSTRACT

Communication systems, for example, wireless communication systems such as long term evolution (LTE) release 11 (Rel-11) may use methods for multiplexing of periodic channel state information reports. Such methods may support the support heavy reliance on channel state information signaling in uplink to provide improved downlink performance. A method can include multiplexing a plurality of channel state information reports into a same subframe. The plurality of channel state information reports can correspond to a user equipment. The method can further include prioritizing a set of channel state information reports including the plurality of channel state information reports.

12 Claims, 4 Drawing Sheets

(56) References Cited

OTHER PUBLICATIONS

ZTE, "Remaining Open Issues of Simultaneous Transmission of UL Channels/Signals," 3GPP Draft; R1-110165, 3GPP TSG RAN WG1 Meeting #63bis, Dublin, Ireland, Jan. 17-21, 2011, XP050599022, 3 pages.
Asustek, "CSI Reporting and Resource Size Considering Activation Status," 3GPP Draft; R1-110962, 3GPP TSG RAN WG1 Meeting #64, Taipei, Taiwan, Feb. 21-25, 2011, XP050599155, 3 pages.
Samsung, "Discussion on Various UCI Combinations for LTE-A," 3GPP Draft; R1-105375, 3GPP TSG RAN WG1 Meeting #62bis, Xian, China, Oct. 11-15, 2010, XP050450524, 2 pages.

* cited by examiner

METHOD FOR MULTIPLEXING OF UPLINK CONTROL INFORMATION

BACKGROUND

This application is related to, claims the priority of, and incorporates by reference in its entirety U.S. Provisional Patent Application No. 61/543,097 filed Oct. 4, 2011, and PCT/EP2012/069442 filed on Oct. 2, 2012.

BACKGROUND

Field

Communication systems, for example, wireless communication systems such as long term evolution (LTE) release 11 (Rel-11) may use methods for multiplexing of periodic channel state information reports. Such methods may support heavy reliance on channel state information signaling in uplink to provide improved downlink performance.

Description of the Related Art

Simultaneous transmission of multiple periodic channel state information reports in uplink on a physical uplink control channel (PUCCH) or physical uplink shared channel (PUSCH) is currently not supported by long term evolution (LTE) specifications.

Regarding the selection of the report to be transmitted, the LTE Release 10 (Rel-10) solution was to first prioritize the reports according to the report type. For example, first (that is, Top) priority: Types 3, 5, 6, and 2a; then 2nd priority: Types 2, 2b, 2c, and 4; and then third priority: Types 1 and 1a. Secondly in LTE Rel-10, if multiple reports have the same priority, a predetermined priority is followed. Specifically, reports are prioritized according to the smallest value of ServCellIndex.

BRIEF DESCRIPTION OF THE DRAWINGS

For proper understanding of the invention, reference should be made to the accompanying drawings, wherein.

DETAILED DESCRIPTION

Figure 1:
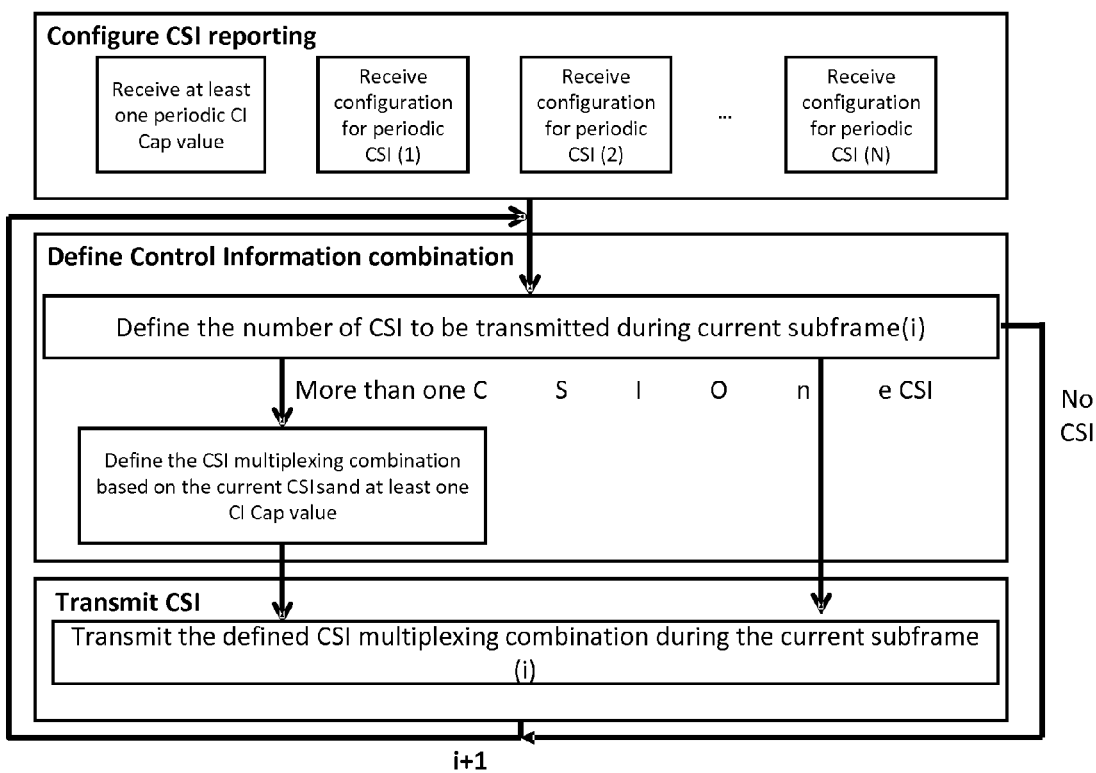
FIG. 1 illustrates user equipment methods according to certain embodiments.

Certain embodiments relate to channel state information (CSI) signaling in uplink (UL) in the case of carrier aggregation. For example, certain embodiments relate to multiplexing solutions for acknowledgment and negative acknowledgment (ACK/NACK), scheduling request indicator (SRI) and channel state information, (periodic channel state information including channel quality indicator (CQI), precoder matrix indicator (PMI), rank indicator (RI), precoder type indicator (PTI) etc.).

Sophisticated multiplexing options supporting simultaneous transmission of ACK/NACKs, SRI and channel state information indicators for multiple component carriers (CCs) can be achieved by, for example, multiplexing of periodic channel state information reports into same subframe.

Such multiplexing operations can support improvements in, for example, coordinated multipoint transmission (CoMP), carrier aggregation, enhanced inter-cell interference coordination (eICIC), and downlink single user multiple input multiple output (SU-MIMO) and multiple user multiple input multiple output (MU-MIMO). These downlink (DL) features share the common feature that their applicability relies heavily on the availability of accurate uplink channel state information. Of course, certain embodiments may also be applicable to technologies that rely less heavily on the availability of accurate uplink channel state information.

The impact of channel state information reporting on the overall system performance may have at least two aspects. Purely from a downlink point of view, the more accurate and elaborate channel state information there is available, the better. From the uplink point of view, on the other hand, the channel state information provides significant overhead by reserving bandwidth that could otherwise be used for data transmission. The efficiency of channel state information transmission, therefore, may be taken into consideration. In particular with carrier aggregation, asymmetrical downlink-uplink combinations may be dominant, hence stretching the uplink capacity required for increased channel state information feedback (FB).

Periodic channel state information reporting on a physical uplink control channel (PUCCH) is one way to provide eNodeB with information on the channel conditions of the user equipment (UEs). Based on the rather frequent periodic channel state information reports the eNodeB can make the decision on which UEs to schedule and, if needed, request the UEs to provide a more elaborate aperiodic channel state information reports on a per need basis.

The capacity of periodic channel state information on the physical uplink control channel with format 2/2a/2b is conventionally limited to a maximum of 11 bits. This may limit the content of the channel state information to simple wideband channel state information.

A conventional user equipment behavior (for example, in LTE Rel-10) in the case when two or more periodic channel state information reports collide, either on a physical uplink control channel or a physical uplink scheduling channel (PUSCH), is to drop all reports except one. The selection of the single one to report is based on a predefined priority. This approach may be consistent with frequency division duplex (FDD) operation and two downlink component carriers (CCs), but can impose challenges when used with a greater number of downlink CCs and/or a time division duplex (TDD) frame structure.

In the case of carrier aggregation, the benefits of periodic channel state information reporting compared to aperiodic triggering include the fact that there may be no physical downlink control channel (PDCCH) overhead and high multiplexing capacity. Hence, periodic physical uplink control channel formats significantly larger than today, capable of delivering moderately large payloads consisting of reports for multiple component carriers without a need to drop all reports except one may be useful in the case of carrier aggregation. One way to extend the capacity of periodic channel state information reporting is to utilize physical uplink control channel format 3-like structure. Options for such an approach include the possibility for frequency allocations larger than 1 physical resource block (PRB) and/or smaller spreading factor for data. Larger bandwidth could also be used to help in maintaining the channel state information coverage better in interference limited scenarios. It is also possible to utilize a physical uplink scheduling channel (PUSCH) as such for periodic channel state information reporting.

The number of parallel independent periodic channel state information reporting configurations can be quite large. For example, the following configurations can exist. In carrier aggregation, support for five CCs can be maintained with channel state information reporting being configured for each CC. Time division multiplexed (TDM) eICIC can be supported using two resource specific periodic channel state information reporting configurations. Coordinated multipoint transmission can include an option with per-cell or per-transmission point feedback, for example separate periodic channel state information reporting configuration for each collaborating cell (typically 3).

As can be seen from the above considerations, the number of independent periodic channel state information reporting configurations operated in parallel can become quite significant (for example, 5*2*3=30 as a worst case example from the numbers above). Bearing in mind that in carrier aggregation in the predominant use cases there may be more downlink than uplink carriers, the feedback and the uplink overhead may be significant. Moreover, in time division duplex (TDD), only a fraction of all subframes are usable for uplink.

Thus, simultaneous transmission of multiple periodic channel state information reports can be used to, for example, provide support for these configurations. Selection of the reports to be transmitted while maintaining sufficient uplink coverage can be accomplished in a variety of ways, as outlined below, although ways of selecting reports are not excluded.

Certain embodiments, therefore, allow for multiplexing of periodic channel state information reports into same subframe. In particular, certain embodiments utilize rules for deciding which of the periodic channel state information reports are transmitted simultaneously.

FIG. 1 illustrates methods according to certain embodiments. FIG. 1 illustrates certain embodiments according to the point of view of a user equipment. As shown in FIG. 1, the following high-level process can be performed. First, for each user equipment, a specific periodic control information cap value is signaled. This cap value may be a maximum number of periodic indicators of channel state information that can be signaled within a given period. The signaling can be semistatic: for example, the signaling can be done using radio resource control (RRC) or media access control (MAC). The signaling can be user equipment specific, or alternatively can be for a group of user equipment or for all user equipment in an area. The periodic control information cap value may be defined in terms of a number of reports that can be multiplexed together at maximum. For example, the user equipment may be allowed to multiplex three channel state information reports. Alternatively (or in addition) the periodic control information cap value may be defined in terms of a total number of bits in the reports that are multiplexed together, for example, 10, 15 or 20 bits (other bit lengths are not excluded). Other definitions for the periodic control information cap value are also permitted, such as equivalent reports measured in terms of coding rate or symbols. The periodic control information cap value may also be used as a switch between predefined multiplexing rules and legacy (for example, Rel-10) functionality. The predefined rules may be defined by the specification and may be loaded into the user equipment in advance.

The periodic control information cap value can also be defined in terms of report type (for example, 1st, 2nd and 3rd priority/type, 5, 6, 2a etc.) Moreover, a combination of the above options can be used to provide more than one limitation at the same time. Furthermore, multiple cap values may be configured to a single user equipment and the one that is applied at a given point in time may be selected based on, for example, the contents of the channel state information. Thus, the cap value selected at a given time can be selected based on the type of the channel state information.

Figure 2:
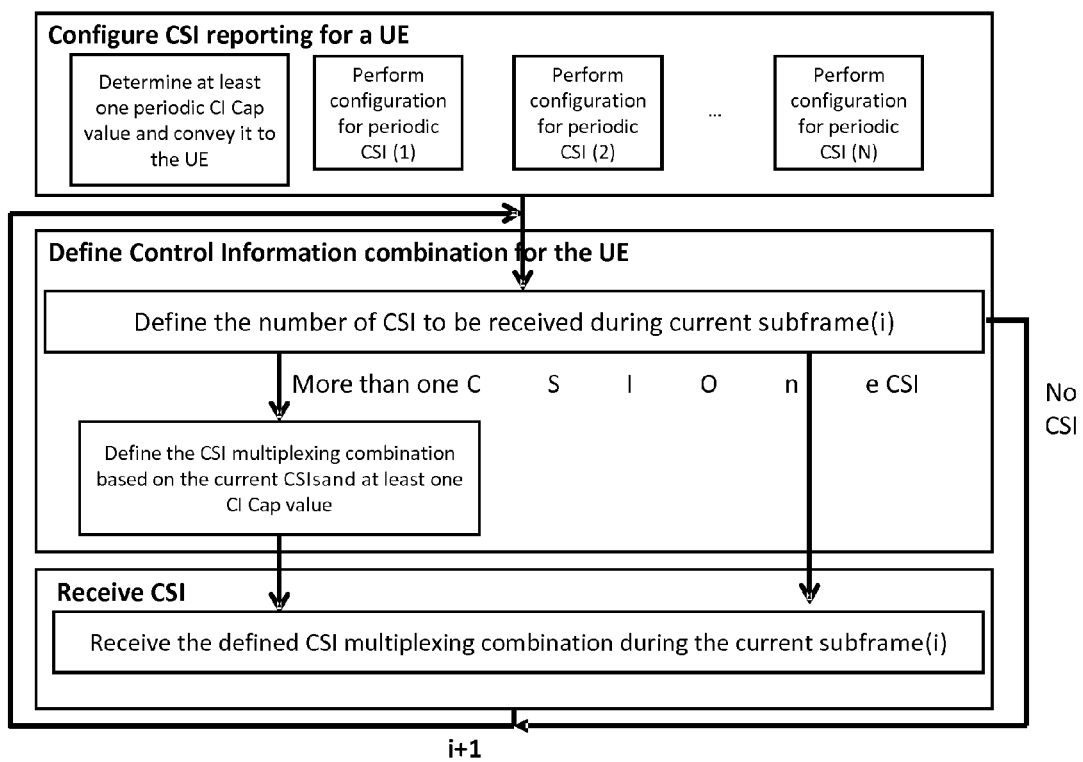
FIG. 2 illustrates access point methods according to certain embodiments.

It should be noted that both user equipment and an access point, such as an eNodeB (eNB), can follow the same prioritization rules in such a way that they always have the same understanding at to the content of channel state information to be multiplexed in a single channel state information report. FIG. 2 illustrates a method from the perspective of an eNB, and provides a counterpart of FIG. 1.

When two or more channel state information reports collide (that is, the need to transmit them coincides), the reports can be first ranked according to given criteria. The ranking principle can be to grant top priority to types 3, 5, 6, and 2a, then priority to types 2, 2b, 2c, and 4, and third priority to types 1 and 1A, similar to LTE Rev-10. These ranking principles can be extended to cover additional scenarios and use cases such as CoMP/eICIC. Furthermore, in addition to transmission of channel state information only, the same multiplexing principles including the cap value can also be applied to the cases when ACK/NACKs or SRI are signaled, either without or together with channel state information. In one embodiment the ACK/NACK and SRI are given higher priority than channel state information.

When the ranking of the reports has been performed, as many reports can be transmitted as permitted by the periodic control information cap value. Meanwhile, the other channel state information reports can be dropped, that is, the other channel state information report can be omitted.

Alternatively, after allocating top ranked reports up to the periodic control information cap value, the user equipment can calculate a remaining unallocated periodic control information cap value. Then, the user equipment can search for smaller size reports fitting into the remainder and include those with the transmission in the order of report ranking. Other channel state information reports can then be dropped.

Specific implementation examples considering channelization are discussed below. It should be understood, however, that these examples are merely illustrations and not limiting.

The methods described above in reference to FIG. 1 can be applied to various scenarios. For example, in the case of periodic channel state information reports colliding and no simultaneous physical uplink scheduling channel (PUSCH) transmission with single carrier uplink transmission enabled, physical uplink control channel format 2/2a/2b or physical uplink control channel format 3 or its derivatives can be used for carrying the reports. Similarly, in the case of periodic channel state information reports colliding and no simultaneous PUSCH transmission with multi-cluster uplink transmission enabled, each coinciding channel state information report can be transmitted on its own dedicated physical uplink control channel resource provided that is does not end up dropped according to the criteria outlined above. In another example, when periodic channel state information reports are colliding and simultaneous PUSCH transmission exists, a similar principle of sort the reports and drop the reports above the cap could be used. The use of such a principle can prevent an excessive number of uplink resources from being used up for channel state information in case there is, for example, an issue with uplink coverage.

Regarding the periodic control information cap value, separate cap values can be configured for each of the three different cases listed above. Also, if different physical uplink control channel formats are considered as a container for the channel state information (for example, physical uplink control channel format 2 vs. physical uplink control channel format 3), the cap can be conveniently defined individually for each one. The link performance of different physical uplink control channel format is different. Alternatively or additionally, it is possible to define the periodic control information cap value separately for different periodic channel state information reports/configurations. The applied value may be defined based on min(periodic control information cap (n)).

There may be various benefits to certain embodiments. For example, certain embodiments can avoid dropping of all channel state information reports except one. On the other hand, certain embodiments do not require that all channel state information reports are transmitted during a single subframe.

The periodic control information cap value may allow for adjusting the multiplexing based on each user equipment's channel conditions, thereby guaranteeing sufficient coverage for the channel state information reporting. Additionally, certain embodiments may provide a uniform solution applicable for various channels and use cases. Thus, allocation of periodic channel state information resources on the physical uplink control channel becomes easier, as the need for collision avoidance is reduced.

Figure 3:
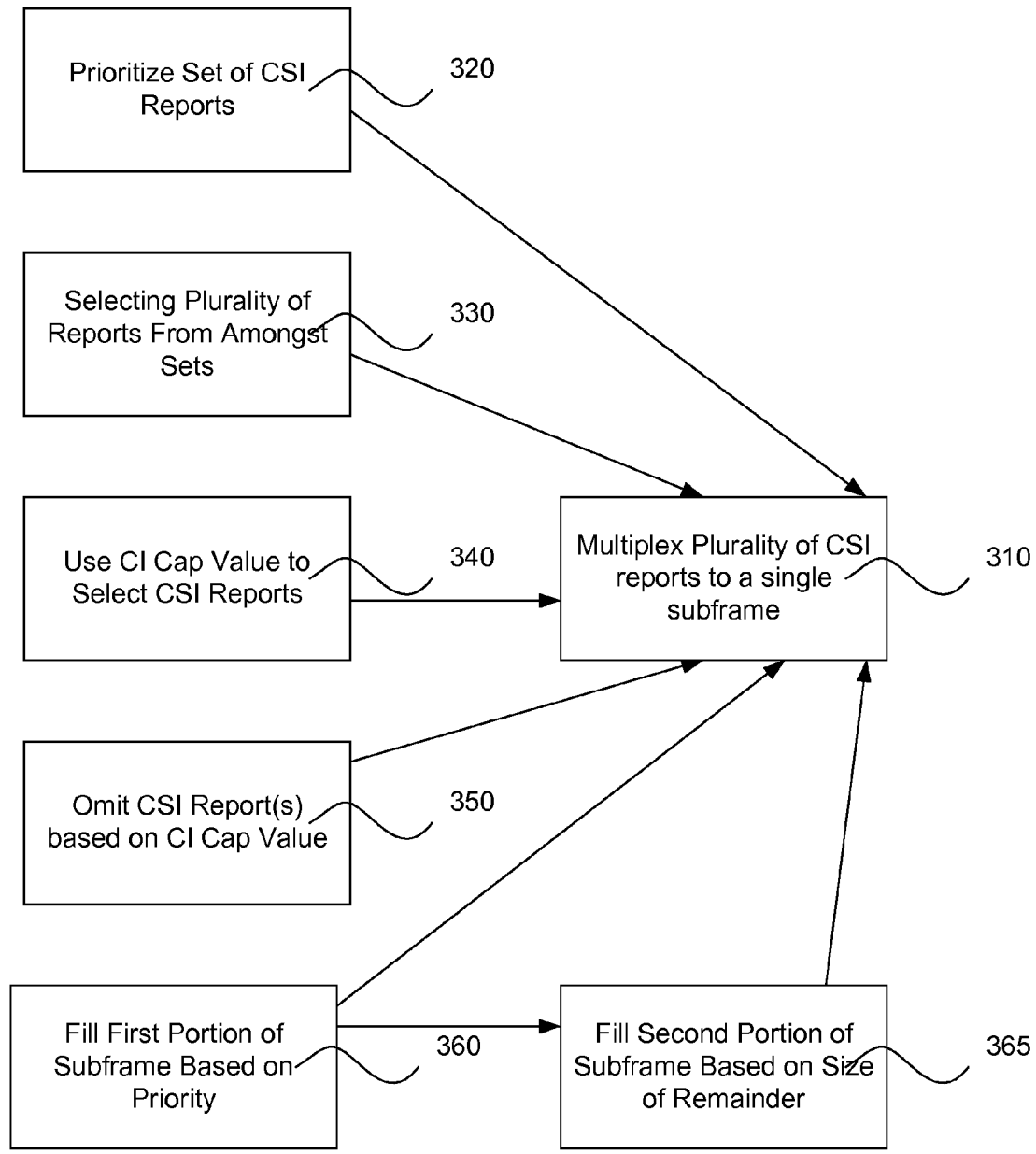
FIG. 3 illustrates a method according to certain embodiments.

FIG. 3 illustrates a method according to certain embodiments. As shown in FIG. 3, a method can include, at 310, multiplexing a plurality of channel state information reports into a same subframe. The plurality of channel state information reports can correspond to a user equipment. The method can be performed by the user equipment.

The method can also include, at 320, prioritizing a set of channel state information reports including the plurality of channel state information reports. At 330, the method can further include selecting the plurality of channel state information reports from among the set of channel state information reports.

The method can include, at 340, selecting the plurality of channel state information reports based on a control information cap value. The method, at 350, further includes omitting at least one channel state information report from the subframe based on the control information cap value. The method can additionally include filling, at 360, a first portion of the control information cap value based on a priority and filling, at 365, a second portion of the channel state information value based on a remaining size.

The above method is described from the point of view of a user equipment. However, a corresponding method or methods can be performed from the standpoint of one or more network elements such as, for example, an eNodeB. The method from the standpoint of the eNodeB may involve providing the control information cap value to the user equipment and demultiplexing the plurality of multiplexed channel state information reports.

Figure 4:
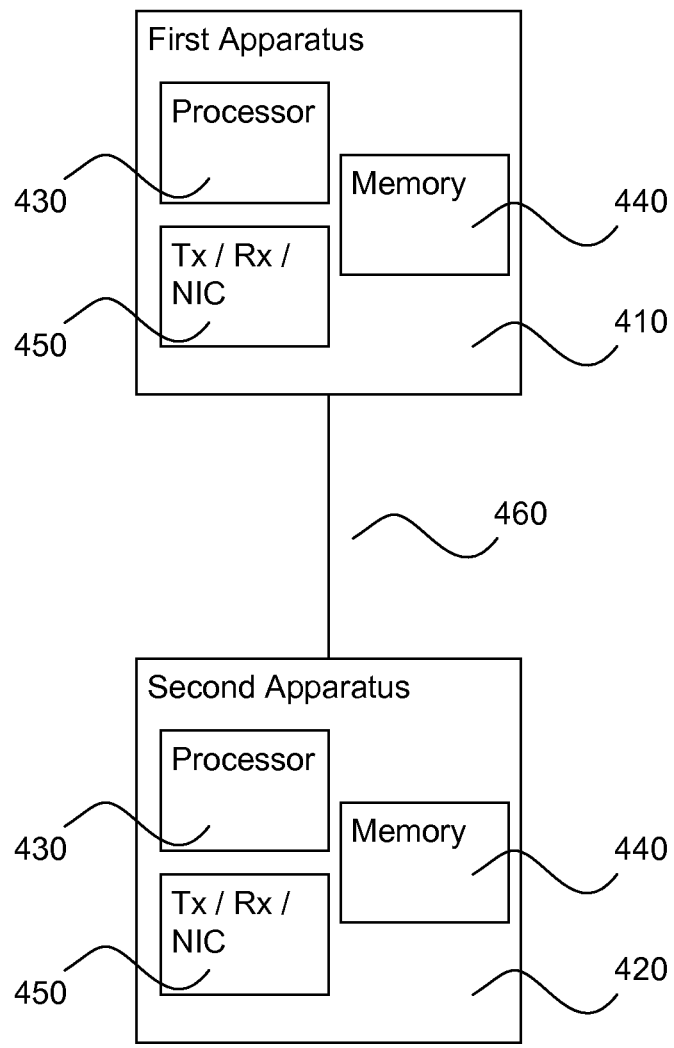
FIG. 4 illustrates a system according to certain embodiments.

FIG. 4 illustrates a system according to certain embodiments. As shown in FIG. 4, the system can include a first apparatus 410 (such as a user equipment) and second apparatus 420 (such as an eNodeB). Each of the apparatuses may be equipped with at least one processor 430, at least one memory 440 (including computer program code or instructions), and transceiver/network interface card 450. The apparatuses may be configured to communicate with one another over an interface 460, which is shown as a wired interface, but may be a wireless interface (or may include more than one wireless and/or wired interfaces coupled together).

The at least one processor 430 can be variously embodied by any computational or data processing device, such as a central processing unit (CPU) or application specific integrated circuit (ASIC). The at least one processor 430 can be implemented as one or a plurality of controllers.

The at least one memory 440 can be any suitable storage device, such as a non-transitory computer-readable medium. For example, a hard disk drive (HDD) or random access memory (RAM) can be used in the at least one memory 440. The at least one memory 440 can be on a same chip as the at least one processor 430, or may be separate from the at least one processor 430.

The computer program instructions may be any suitable form of computer program code. For example, the computer program instructions may be a compiled or interpreted computer program.

The at least one memory 440 and computer program instructions can be configured to, with the at least one processor 430, cause a hardware apparatus (for example, a user equipment or an eNodeB) to perform a process, such as the processes shown in FIGS. 1-3 or any other process described herein.

Thus, in certain embodiments, a non-transitory computer-readable medium can be encoded with computer instructions that, when executed in hardware perform a process, such as one of the processes described above. Alternatively, certain embodiments of the present invention may be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
    receiving, by a user equipment from a network, a plurality of separate periodic control information cap values, each defining a maximum amount of resources that can be used in a subframe for transmitting periodic channel state information reports over a specific type of physical uplink control channel format;
    ranking periodic channel state information reports based on one or more predetermined criteria, wherein the periodic channel state information reports correspond to the user equipment;
    selecting, for a specific type of physical uplink control channel format, a set of highest ranking periodic channel state information reports on the basis of a corresponding control information cap value; and
    multiplexing the selected set of highest ranking periodic channel state information reports into the same subframe for transmission to the network.

2. The method of claim 1, further comprising:
    applying the periodic control information cap values for determining whether the user equipment is to multiplex a plurality of periodic channel state information reports into one subframe or to send a single periodic channel state information report in the subframe.

3. The method of claim 1, further comprising:
    acquiring a plurality of separate periodic control information cap values, each defining a maximum amount of resources that can be used in the subframe for transmitting a specific type of periodic channel state information reports.

4. The method of claim 1, further comprising:
omitting at least one periodic channel state information report from transmission in the subframe based on the periodic control information cap values.

5. The method of claim 1, further comprising:
filling a portion of a given periodic control information cap value with the set of highest ranking periodic channel state information reports; and
filling at least part of the remaining portion of the given control information cap value with the lower ranking periodic channel state information reports having smaller size.

6. An apparatus, comprising:
at least one processor; and
at least one memory including computer program code,
wherein the at least one memory and computer program code are configured to, with the at least one processor, cause the apparatus at least to
receive, from a network, a plurality of separate periodic control information cap values, each defining a maximum amount of resources that can be used in a subframe for transmitting periodic channel state information reports over a specific type of physical uplink control channel format;
rank periodic channel state information reports based on one or more predetermined criteria, wherein the periodic channel state information reports correspond to the user equipment;
select, for a specific type of physical uplink control channel format, a set of highest ranking periodic channel state information reports on the basis of a corresponding control information cap value; and
multiplex the selected set of highest ranking periodic channel state information reports into the same subframe for transmission to the network.

7. The apparatus of claim 6, wherein the at least one memory and computer program code are configured to, with the at least one processor, cause the apparatus at least to apply the periodic control information cap values for determining whether the user equipment is to multiplex a plurality of periodic channel state information reports into one subframe or to send a single periodic channel state information report in the subframe.

8. The apparatus of claim 6, wherein the at least one memory and computer program code are additionally configured to, with the at least one processor, cause the apparatus at least to acquire a plurality of separate periodic control information cap values, each defining a maximum amount of resources that can be used in the subframe for transmitting a specific type of periodic channel state information reports.

9. The apparatus of claim 6, wherein the at least one memory and computer program code are configured to, with the at least one processor, cause the apparatus at least to omit at least periodic one channel state information report from transmission in the subframe based on the periodic control information cap values.

10. The apparatus of claim 6, wherein the at least one memory and computer program code are configured to, with the at least one processor, cause the apparatus at least to fill a portion of a given periodic control information cap value with the set of highest ranking periodic channel state information and fill at least part of the remaining portion of the given control information cap value with the lower ranking periodic channel state information reports having smaller size.

11. A non-transitory computer-readable medium encoded with computer instructions that, when executed in hardware, perform a process, the process comprising the method of claim 1.

12. An apparatus, comprising:
at least one processor; and
at least one memory including computer program code,
wherein the at least one memory and computer program code are configured to, with the at least one processor, cause the apparatus at least to
determine a plurality of separate periodic control information cap values, each defining a maximum amount of resources that can be used in a subframe by a user equipment to transmit periodic channel state information reports to the network node over a specific type of physical uplink control channel format;
provide the plurality of periodic control information cap value to the user equipment;
receive a set of periodic channel state information reports multiplexed in the subframe from the user equipment, wherein the set of periodic channel state information reports is selected by the user equipment based on a corresponding periodic control information cap value; and
demultiplex the received set of periodic channel state information reports.

* * * * *